(12) United States Patent
Yoon et al.

(10) Patent No.: US 11,715,603 B2
(45) Date of Patent: Aug. 1, 2023

(54) DIELECTRIC MATERIAL HAVING IMPROVED DC BIAS DIELECTRIC CONSTANT AND MULTILAYER CERAMIC ELECTRONIC COMPONENT USING THE SAME

(71) Applicant: SAMSUNG ELECTRO-MECHANICS CO., LTD., Suwon-si (KR)

(72) Inventors: Seok Hyun Yoon, Suwon-si (KR); Dong Hun Kim, Suwon-si (KR); Jin Woo Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 351 days.

(21) Appl. No.: 17/034,648

(22) Filed: Sep. 28, 2020

(65) Prior Publication Data

US 2021/0383975 A1 Dec. 9, 2021

(30) Foreign Application Priority Data

Jun. 5, 2020 (KR) .................. 10-2020-0068305

(51) Int. Cl.
*H01G 4/30* (2006.01)
*C08K 3/26* (2006.01)
(Continued)

(52) U.S. Cl.
CPC ............. *H01G 4/30* (2013.01); *C04B 35/468* (2013.01); *C08K 3/26* (2013.01); *H01G 4/008* (2013.01);
(Continued)

(58) Field of Classification Search
CPC .......... H01G 4/30; H01G 4/008; H01G 4/012; H01G 4/1227; H01G 4/1245; C08K 3/26;
(Continued)

(56) References Cited

U.S. PATENT DOCUMENTS 6,344,427 B1 * 2/2002 Komatsu ............. C04B 35/6262
361/321.5
6,403,513 B1 * 6/2002 Sato ...................... C04B 35/468
361/321.5
(Continued)

FOREIGN PATENT DOCUMENTS

JP H08-124785 A 5/1996
JP 4487476 B2 * 6/2010
(Continued)

OTHER PUBLICATIONS

J. Ha, et al., "Microstructure and Structural Analysis of the x(Na0.5K0.5)NbO3-(1-x)BaTiO3 Ceramics for MLCCs," Korean J. Met. Mater, vol. 52, No. 5, pp. 379-384, 2014.
(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A dielectric material includes a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$ and $0 \leq y \leq 0.05$) and a subcomponent. When an angle corresponding to a maximum peak is referred to as $\theta_0$ and angles corresponding to a full width at half maximum (FWHM) are respectively referred to as $\theta_1$ and $\theta_2$ ($\theta_1 < \theta_2$) in the peaks of (002) and (200) plane of an x-ray diffraction (XRD) pattern using Cu Kα1 radiation (wavelength $\Delta=1.5406$ Å), $(\theta_2-\theta_0)/(\theta_0-\theta_1)$ is greater than 0.54 to 1.0 or less.

16 Claims, 10 Drawing Sheets

(51) Int. Cl.
    *H01G 4/012*    (2006.01)
    *H01G 4/12*     (2006.01)
    *H01G 4/008*    (2006.01)
    *C04B 35/468*   (2006.01)
(52) U.S. Cl.
    CPC ........... *H01G 4/012* (2013.01); *H01G 4/1227* (2013.01); *C01P 2002/74* (2013.01); *C08K 2003/265* (2013.01)
(58) Field of Classification Search
    CPC . C08K 2003/265; C01P 2002/74; H01B 3/10; H01B 3/08; H01B 5/14
    See application file for complete search history.

(56) References Cited

U.S. PATENT DOCUMENTS

| | | | | |
|---|---|---|---|---|
| 6,746,980 | B2* | 6/2004 | Tokita | C04B 35/4682 501/137 |
| 2001/0035563 | A1* | 11/2001 | Masumiya | C04B 35/4682 257/532 |
| 2004/0121153 | A1* | 6/2004 | Venigalla | C04B 35/626 428/386 |
| 2005/0102808 | A1* | 5/2005 | Hirata | H01G 4/1227 29/25.42 |
| 2007/0211409 | A1* | 9/2007 | Hara | C04B 35/638 361/311 |
| 2014/0268492 | A1* | 9/2014 | Jeong | C04B 35/4682 501/137 |
| 2015/0062774 | A1 | 3/2015 | Yoon et al. | |
| 2015/0221438 | A1* | 8/2015 | Lim | C04B 35/4682 29/25.42 |

FOREIGN PATENT DOCUMENTS

| | | | |
|---|---|---|---|
| KR | 10-2004-0069044 A | | 8/2004 |
| KR | 20090110261 A | * | 10/2009 |
| KR | 10-2015-0028057 A | | 3/2015 |

OTHER PUBLICATIONS

"Difference between compositional and grain size effect on the dielectric nonlinearity of Mn and V-doped BaTiO3 multilayer ceramic capacitors," Journal of Applied Physics, vol. 115, No. 244101, 2014.

* cited by examiner

DIELECTRIC MATERIAL HAVING IMPROVED DC BIAS DIELECTRIC CONSTANT AND MULTILAYER CERAMIC ELECTRONIC COMPONENT USING THE SAME

CROSS-REFERENCE TO RELATED APPLICATION(S)

This application claims the benefit under 35 USC 119 (a) of Korean Patent Application No. 10-2020-0068305 filed on Jun. 5, 2020 in the Korean Intellectual Property Office, the entire disclosure of which is incorporated herein by reference for all purposes.

BACKGROUND

1. Field

The present disclosure relates to a dielectric material and a multilayer ceramic electronic component using the same.

2. Description of Related Art

Generally, an electronic component using a ceramic material, such as a capacitor, an inductor, a piezoelectric element, a varistor, a thermistor, or the like, includes a ceramic body formed of a ceramic material, internal electrodes formed in the ceramic body, and external electrodes mounted on surfaces of the ceramic body to be connected to the internal electrodes.

With the recent trend for small-sized and multifunctional electronic components, chip components have tended to have a smaller size and higher performance. Therefore, a multilayer ceramic capacitor is required to have higher capacitance while having a smaller size.

For example, as a method of achieving a smaller size and higher capacitance of a multilayer ceramic capacitor, a larger number of thinned dielectric and electrode layers are laminated in a multilayer ceramic capacitor. Current dielectric layers each have a thickness of about 0.7 μm and are under development to be thin.

The miniaturization of multilayer ceramic capacitors causes deterioration in product reliability, high-temperature withstand voltage characteristics, and DC bias characteristics. The term "DC bias characteristic" refers to a phenomenon in which capacitance or a dielectric constant is decreased as a size of a DC bias field, applied to a product, is increased.

For example, products are often used in a state in which a DC bias is applied, as in an applicable example of a power management integrated circuit, or the like. In addition, there is an increasing need to implement a high effective dielectric constant or capacitance under a condition in which a high field DC bias is applied.

SUMMARY

An aspect of the present disclosure is to provide a dielectric material having an improved DC bias dielectric constant and a multilayer ceramic electronic component.

An aspect of the present disclosure is to provide a dielectric material having improved high-temperature withstand voltage characteristics and a multilayer ceramic electronic component.

An aspect of the present disclosure is to provide a dielectric material, capable of satisfying X5R or X7R, and a multilayer ceramic electronic component.

According to an aspect of the present disclosure, a dielectric material includes a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$ and $0 \leq y \leq 0.05$) and a subcomponent. When an angle corresponding to a maximum peak is referred to as $\theta_0$ and angles corresponding to a full width at half maximum (FWHM) are respectively referred to as $\theta_1$ and $\theta_2$ ($\theta 1 < \theta 2$) in the peaks of (002) and (200) plane of an X-ray diffraction (XRD) pattern using Cu Kα1 radiation (wavelength $\lambda = 1.5406$ Å), $(\theta_2-\theta_0)/(\theta_0-\theta_1)$ is greater than 0.54 to 1.0 or less.

According to an aspect of the present disclosure, a multilayer ceramic electronic component includes a ceramic body, including a dielectric layer, a first internal electrode, and a second internal electrode, and a first external electrode and a second external electrode, respectively disposed on external surfaces of the ceramic body and respectively connected to the first internal electrode and the second internal electrode. The dielectric layer includes a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$ and $0 \leq y \leq 0.05$) and a subcomponent. When an angle corresponding to a maximum peak is referred to as $\theta_0$ and angles corresponding to a full width at half maximum (FWHM) are respectively referred to as $\theta_1$ and $\theta_2$ ($\theta 1 < \theta 2$) in the peaks of (002) and (200) plane of an XRD pattern using Cu Kα1 radiation (wavelength $\lambda = 1.5406$ Å), $(\theta_2-\theta_0)/(\theta_0-\theta_1)$ is greater than 0.54 to 1.0 or less.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
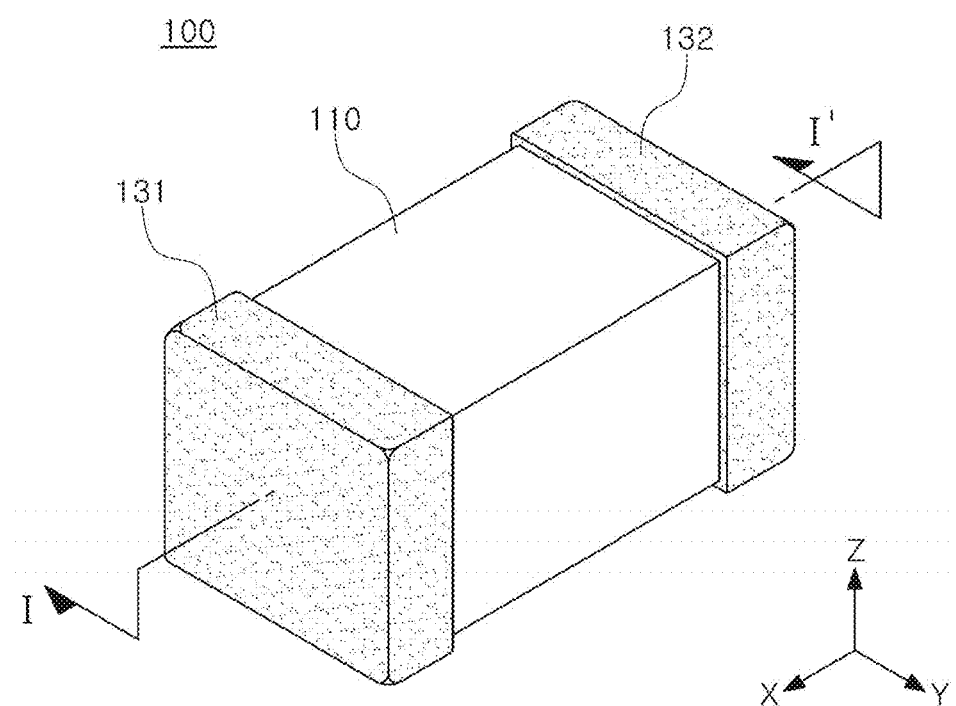
FIG. 1 is a schematic view of a microstructure, after sintering, according to an embodiment of the present disclosure.

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the description, irrelevant descriptions will be omitted to clearly describe the present disclosure. In the drawings, thicknesses may be magnified to clearly express a plurality of layers and areas. The same elements having the same function within the scope of the same concept will be described with use of the same reference numerals. Throughout the specification, when a component is referred to as "comprise" or "comprising" one or more other components, it means that it may include further components as well, rather than excluding further components, unless specifically stated otherwise.

In the present specification, expressions such as "having," "may have," "comprises," or "may contain" may include a presence of a corresponding feature (e.g., components such as numerical, functions, operations, components, or the like) without excluding the presence of additional feature does (s).

In the present specification, expressions such as "A or B," "at least one of A or/and B," "one or more of A or/and B," or the like may include all possible combinations items listed together. For example, "A or B," "at least one of A and B," or "at least one of A or B" may refer to include cases of (1) at least one A, (2) at least one B, or (3) both including at least one A and at least one B.

In the drawings, an X direction may be defined as a first direction, a length (L) direction, or a longitudinal direction; a Y direction may be defined as a second direction, a W direction, or a width direction; and a Z direction may be defined as a third direction, a T direction, or a thickness direction.

The present disclosure relates to a dielectric material, and the dielectric material according to the present disclosure is applied to an electronic component. An electronic component including the dielectric material of the present disclosure may include, for example, a capacitor, an inductor, a piezoelectric element, a varistor, or a thermistor, but the present disclosure is not limited thereto.

A dielectric material according to an embodiment may include a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$ and $0 \leq y \leq 0.05$) and a subcomponent. When an angle corresponding to a maximum peak is referred to as $\theta_0$ and angles corresponding to a full width at half maximum (FWHM) are respectively referred to as $\theta_1$ and $\theta_2$ ($\theta 1 < \theta 2$) in the peaks of (002) and (200) plane of an XRD pattern using Cu K$\alpha$1 radiation (wavelength $\lambda$=1.5406 Å), $(\theta_2-\theta_0)/(\theta_0-\theta_1)$ may be more than 0.54 to 1.0 or less.

Figure 2:
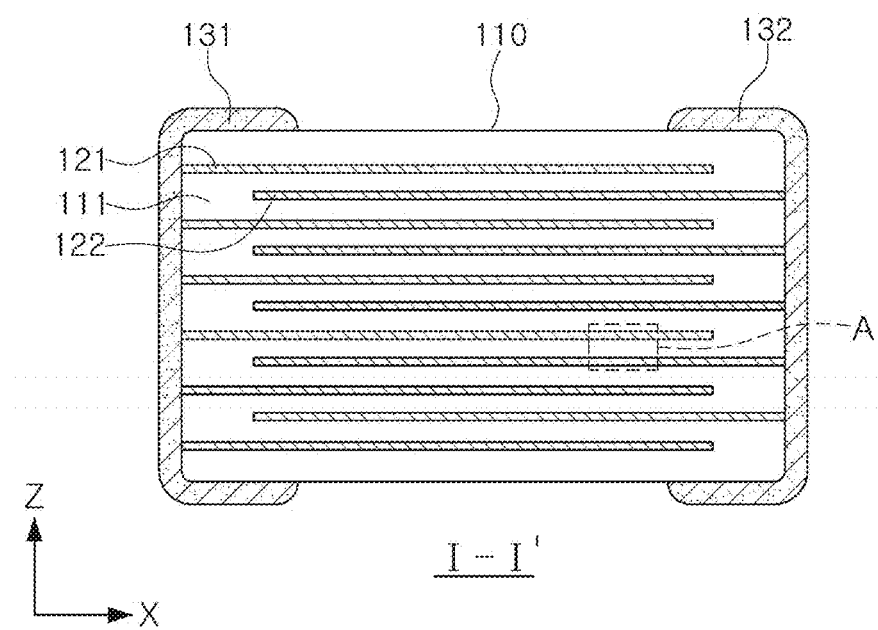
FIG. 2 is a cross-sectional view taken along line I-I' in FIG. 1.
Figure 3:
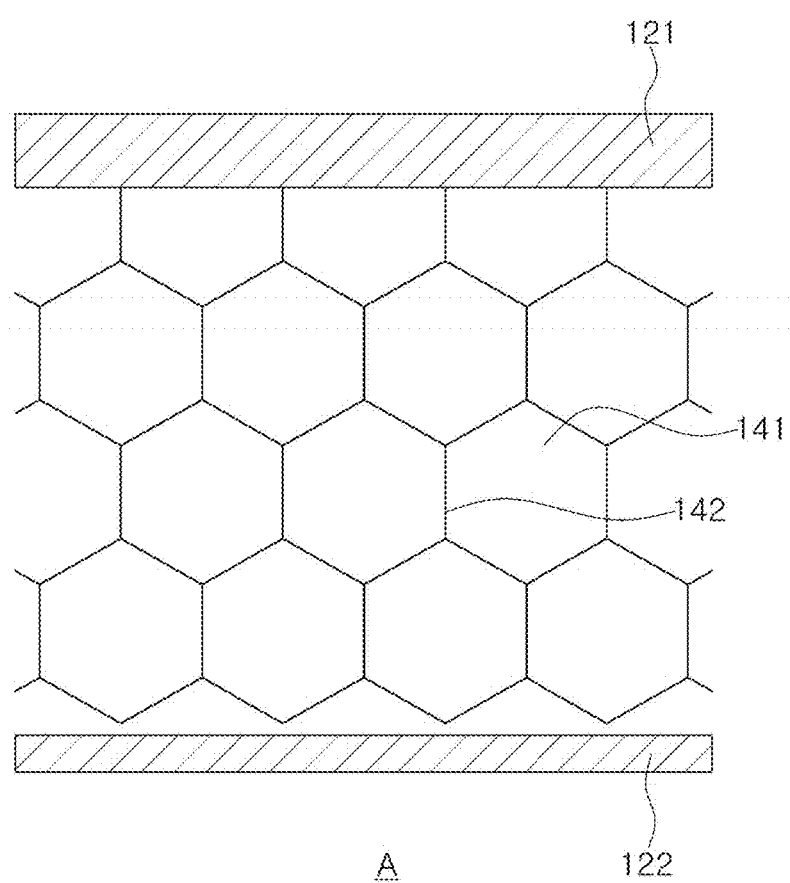
FIG. 3 is an enlarged view of region 'A' in FIG. 2.

In an example, the dielectric material of the present disclosure may include grains and grain boundaries. FIGS. 1 to 3 are schematic views illustrating a microstructure of the dielectric material according to an embodiment of the present disclosure. The dielectric material according to the present disclosure may be formed by sintering a main component and subcomponent to be described later. In addition, the dielectric material formed by sintering the main component and the subcomponent may include a grain 141 and a grain boundary 142.

In general, a dielectric material is required to have characteristics of high dielectric constant. Accordingly, research has been conducted to improve crystallinity of a dielectric composition constituting the dielectric material. On the other hand, the present inventors found that a high field DC bias dielectric constant varies depending on tetragonality (c/a) of a grain generated after sintering.

Figure 4:
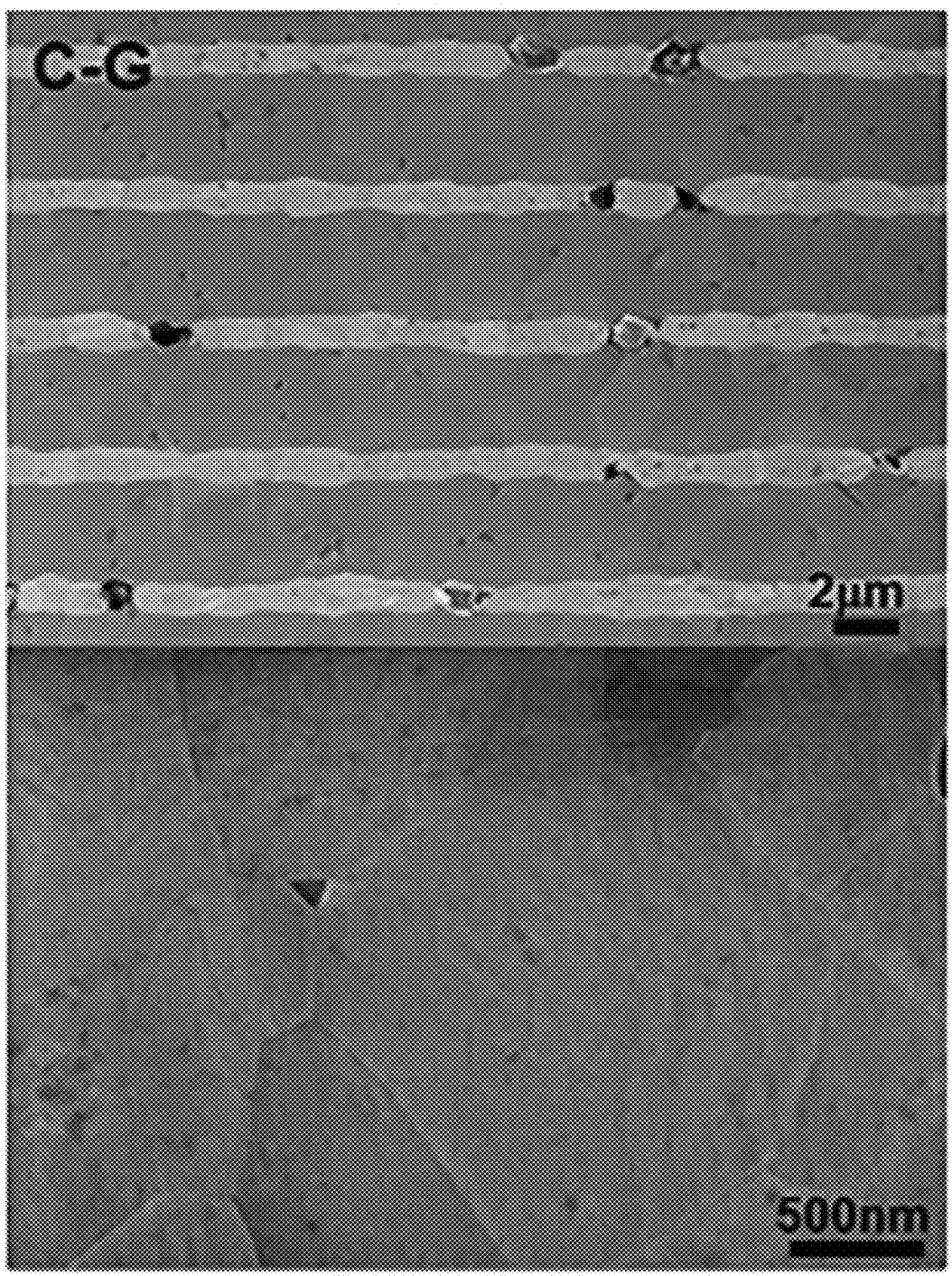
FIGS. 4 to 6 are scanning electron microscope (SEM) analysis images of prototype samples of the invention of the present disclosure.
Figure 5:
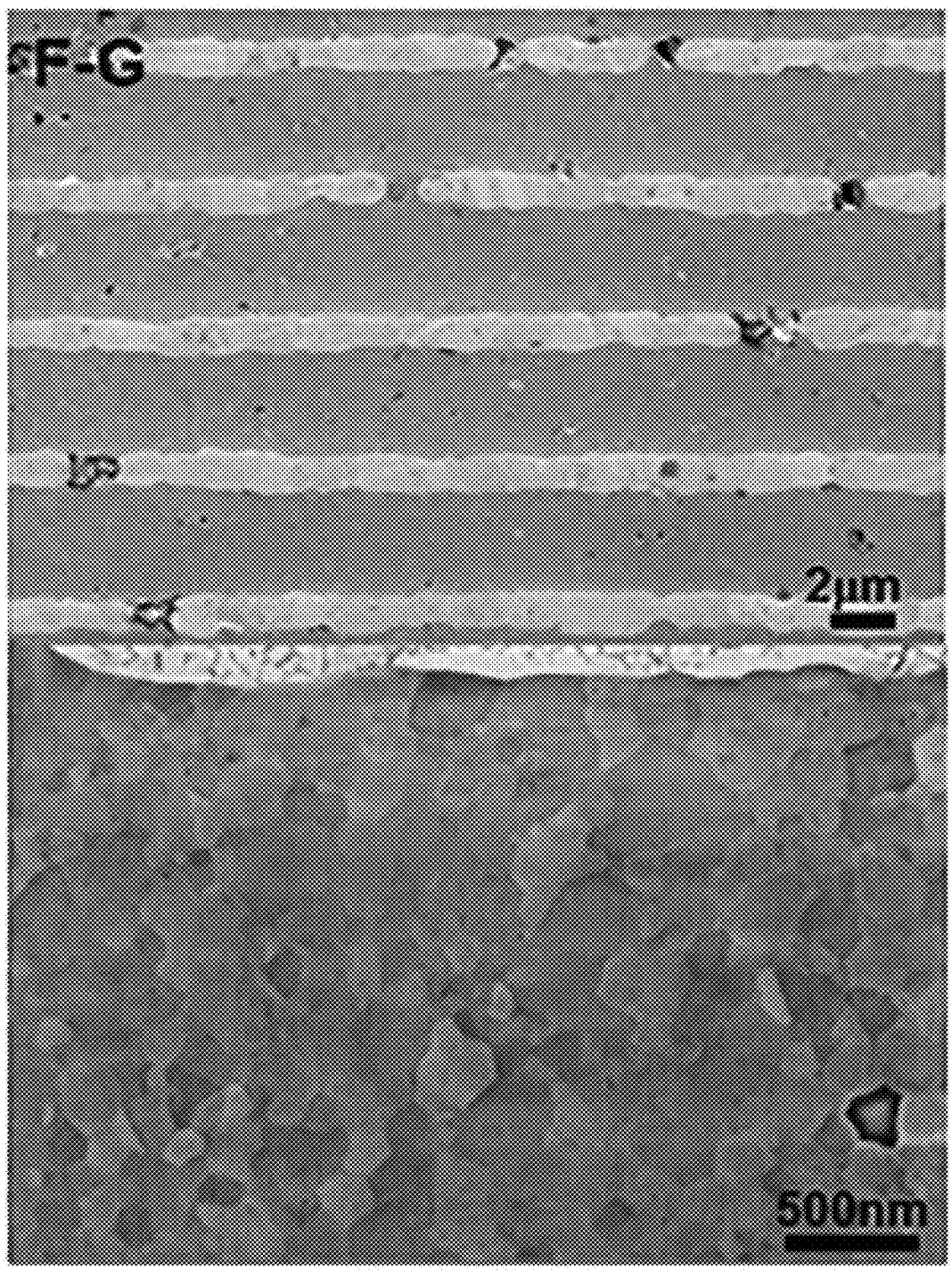
Figure 6:
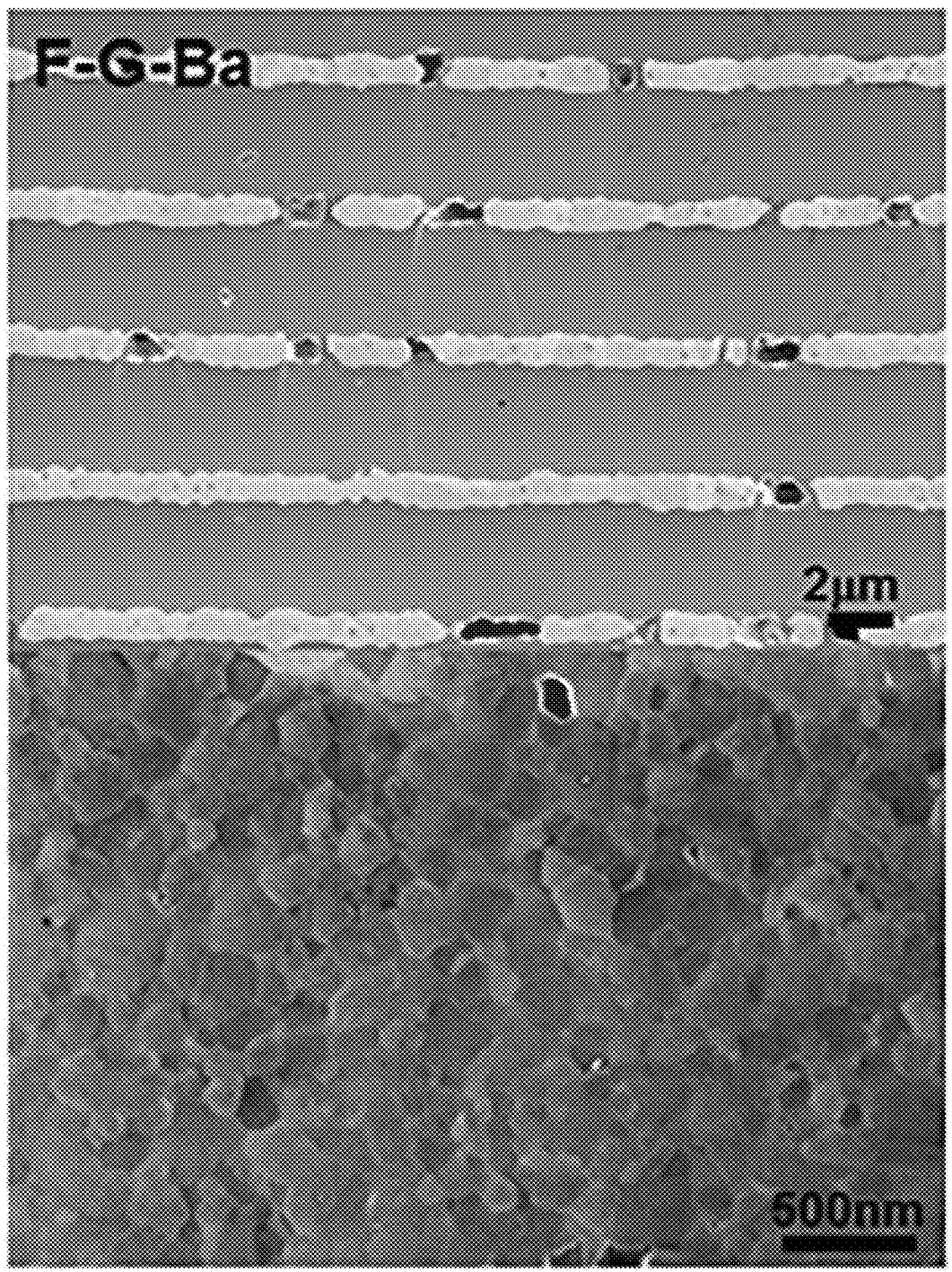

Three types of prototype multilayer ceramic capacitor (MLCC) samples were prepared and tested to confirm a relationship between tetragonality (c/a) of a grain and a high field DC bias dielectric constant. FIGS. 4 to 6 illustrate microstructures of coarse grains $BaTiO_3$ (C-G), fine grains $BaTiO_3$ (F-G), and fine grains Ba-doped $BaTiO_3$ (F-G-Ba), respectively. Average sizes of the grains, confirmed through FIGS. 4 to 6, were 1740 nm, 251 nm, and 259 nm, respectively. Therefore, a comparison between FIG. 4 (CG) and FIG. 5 (FG) reflects a difference depending on a grain size, and a comparison between FIG. 5 (FG) and FIG. 6 (F-G-Ba) shows a comparison result when a composition varies under the condition of the same particle size.

Figure 7:
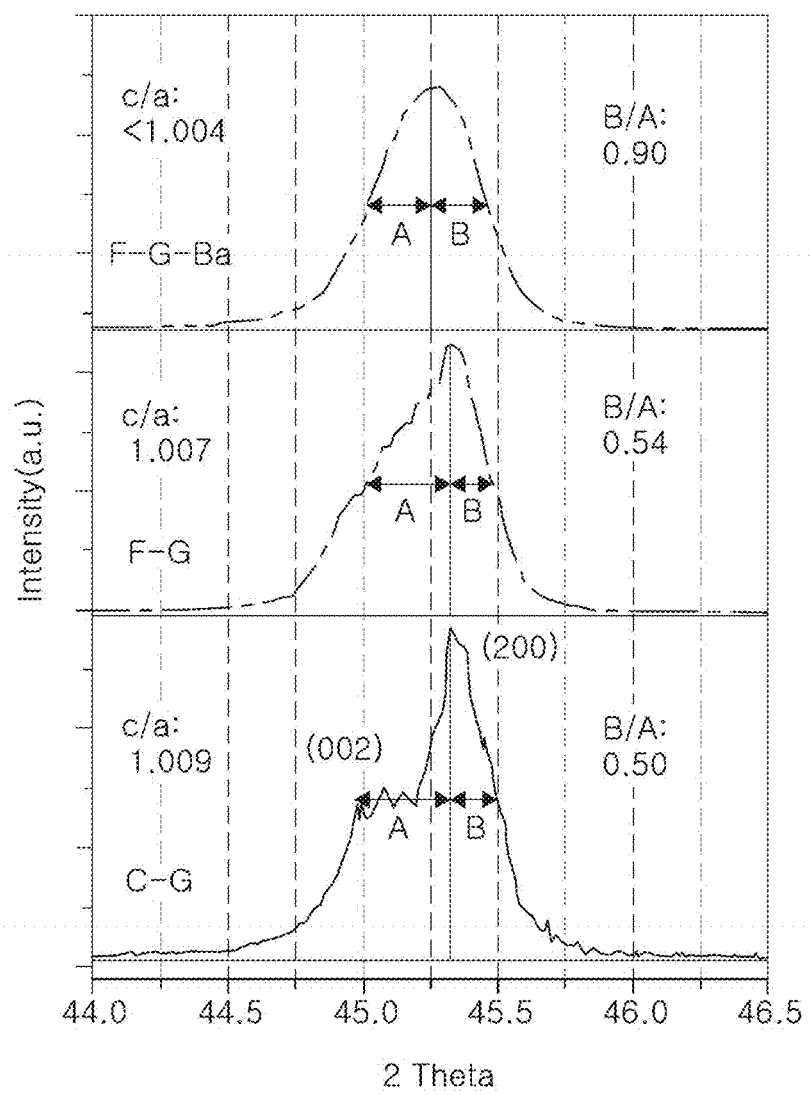
FIG. 7 illustrates an XRD analysis result of the prototype samples of the invention of the present disclosure.

FIG. 7 illustrates a $BaTiO_3$ (002) and (200) planes using Cu K$\alpha$1 radiation (wavelength $\lambda$=1.5406 Å) and an XRD pattern corresponding to the (002) and (200) planes of powder-type specimens, respectively prepared by pulverizing C-G, F-G, and F-G-Ba. As can be seen from FIG. 7, a size of tetragonality (c/a) is as follows: C-G>F-G>F-G-Ba, and C-G shows clear peak separation between the $BaTiO_3$ (002) plane and a (200) plane, but the two peaks partially overlap each other in F-G, and the two peaks completely overlap each other in F-G-Ba to have a substantially cubic structure.

Referring to FIG. 7, when an angle corresponding to a maximum peak is referred to as $\theta_0$ and angles corresponding to a full width at half maximum (FWHM) are respectively referred to as $\theta_1$ and $\theta_2$ (0102) in the peaks of (002) and (200) plane of an XRD pattern using Cu K$\alpha$1 radiation (wavelength $\lambda$=1.5406 Å) for C-G, F-G, and F-G-Ba, $(\theta_0-\theta_1)$ may refer to a difference 'A' between the angle corresponding to the maximum peak and an angle corresponding to a smaller angle of the FWHM, and $(\theta_2-\theta_0)$ may refer to a difference 'B' between an angle corresponding to a larger angle of the FWHM and the angle corresponding to the maximum peak. In this case, it is confirmed that as the tetragonality (c/a) is increased to 1.004 (F-G-Ba), 1.007 (F-G), and 1.009 (C-G), a value of B/A is decreased.

Figure 8:
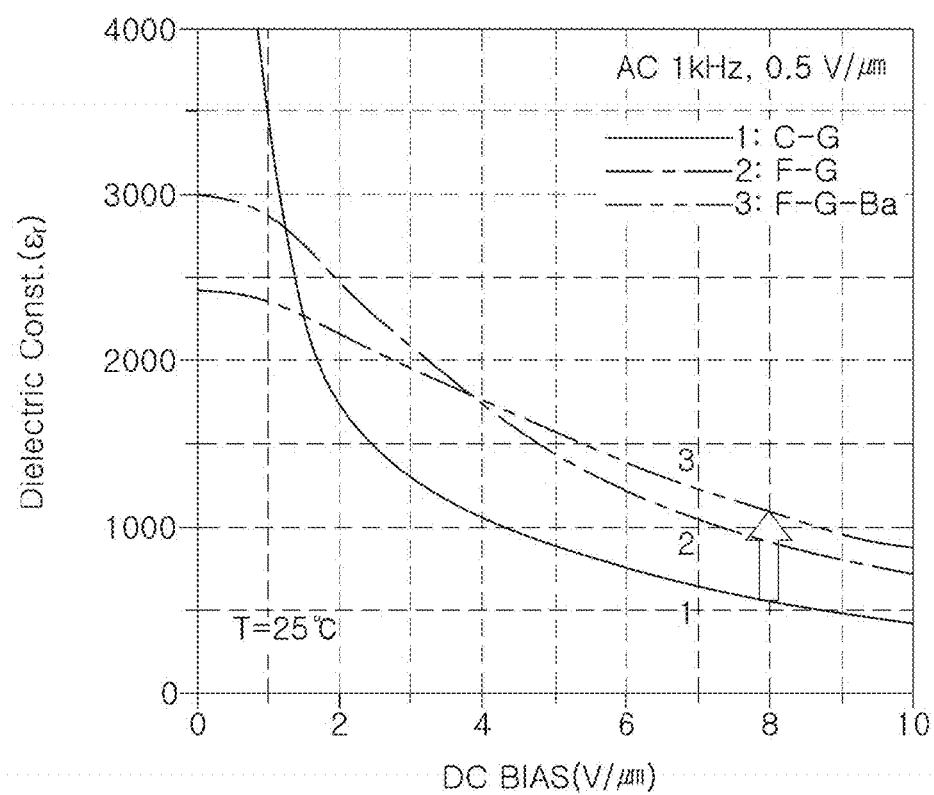
FIG. 8 is a graph illustrating dielectric constants, depending on a DC bias field, of the prototype samples of the invention of the present disclosure.
Figure 9:
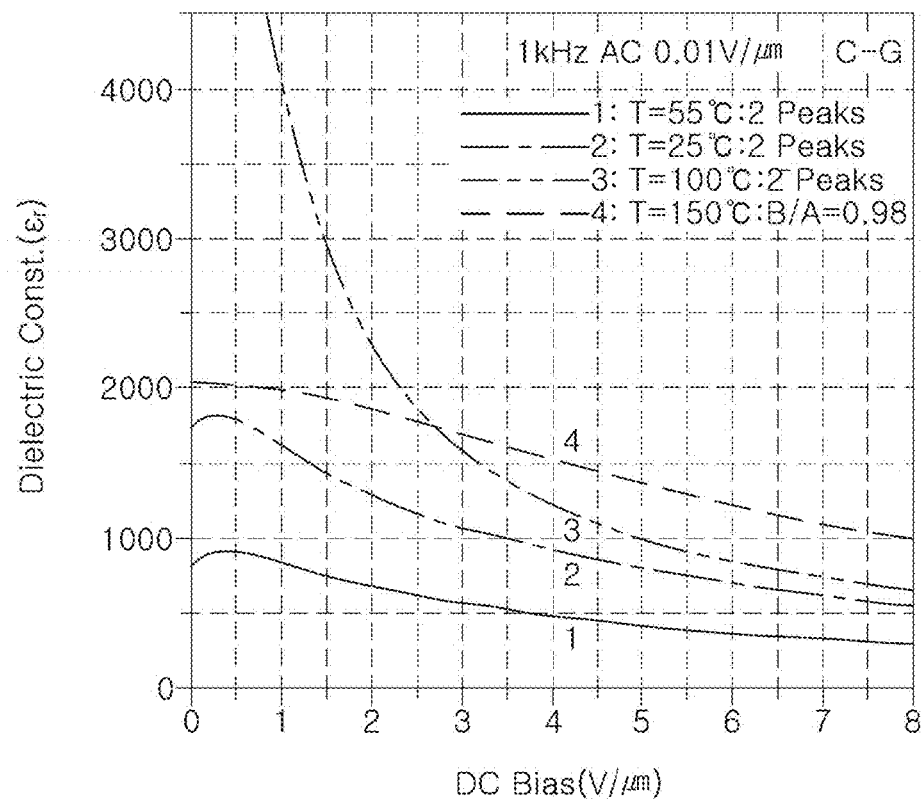
FIG. 9 is a graph illustrating dielectric constant, depending on a DC bias field at various temperatures, of the prototype samples of the invention of the present disclosure.

FIG. 8 illustrates dielectric constants depending on DC bias fields of C-G, F-G, and F-G-Ba at room temperature. As can be seen from FIG. 8, a dielectric constant in a high DC field of 8 V/m or more is increased as a grain size is decreased from C-G to F-G. In addition, when F-G and F-G-Ba are compared under the condition of the same grain size, it may be confirmed that a high DC field dielectric constant is increased according to the composition of a dielectric material. Such a result indicates that the high DC field bias dielectric may be improved by changing a composition of the dielectric material.

According to the above result, it may be confirmed that as the tetragonality of the dielectric material is decreased, B/A (=a ratio of the difference between an angle corresponding to a larger angle of the FWHM and the angle corresponding to the maximum peak to the difference between the angle corresponding to the maximum peak and an angle corresponding to a smaller angle of the FWHM) is increased and the high DC field dielectric constant is improved. In addition, it may be confirmed that when an angle corresponding to a maximum peak is referred to as $\theta_0$ and angles corresponding to a full width at half maximum (FWHM) are respectively referred to as $\theta_1$ and $\theta_2$ ($\theta 1 < \theta 2$) in the peaks of (002) and (200) plane of an XRD pattern using Cu K$\alpha$1 radiation (wavelength $\lambda$=1.5406 Å), and $(\theta_2-\theta_0)/(\theta_0-\theta_1)$ (=B/A=the ratio of the difference between an angle corresponding to a larger angle of the FWHM and the angle corresponding to the maximum peak to the difference between the angle corresponding to the maximum peak and an angle corresponding to a smaller angle of the FWHM) is greater than 0.54, the dielectric material has an improved high DC field bias dielectric constant.

The ratio of the difference between angles $(\theta_2-\theta_0)/(\theta_0-\theta_1)$ (=B/A) may be greater than 0.54, 0.55 or more, 0.56 or more, 0.57 or more or 0.58 or more, and 1 or less or smaller than 1, but the present disclosure is not limited thereto. When the ratio of the difference between angles $(\theta_2-\theta_0)/(\theta_0-\theta_1)$ (=B/A) satisfies the above range, the dielectric material has an improved high DC field bias dielectric constant.

The dielectric material according to an embodiment may include a main component and a subcomponent, and the subcomponent may include at least one of first to sixth subcomponents. In this specification, the term "main component" may refer to a component accounting for a relatively higher weight ratio than the other components, and may refer to a component included in an amount of 50 wt % or more, based on an overall weight of a composition or a dielectric material layer. In addition, the term "subcomponent" may refer to a component accounting for a relatively lower weight ratio than the main components, and may refer to a component included in an amount less than 50 wt %, based on the overall weight of the composition or the dielectric material layer.

Hereinafter, each component of the dielectric material according to an embodiment will be described in further detail.

Main Component

The dielectric material according to an embodiment may include a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$, $0 \leq y \leq 0.05$). The main component may be, for example, a chemical compound in which a portion of Ca, Zr, Sn, and/or Hf is solid-solubilized in $BaTiO_3$. In the composition formula, x may range from 0 or more to 1 or less, and y may range from 0 or more to 0.05 or less, but the present disclosure is not limited thereto. For example, in the composition formula, when x is 0, y is 0, and z is 0, the main component may be $BaTiO_3$.

First Subcomponent

According to an embodiment, the dielectric material according to the present disclosure may include at least one variable-valence acceptor element as a first subcomponent. In some embodiment, the dielectric material may include at least one selected from the group consisting of Mn, V, Cr, Fe, Ni, Co, Cu, and Zn, oxides thereof, and carbonates thereof, as a first subcomponent. In some embodiments, the variable-valence acceptor elements may include Mn, V, Cr, Fe, Ni, Co, Cu, or Zn.

The first subcomponent may be included in an amount of 0.1 parts by mol or more or 1.0 part by mol or less, based on 100 parts by mol of the main component. The first subcomponent may be included within a range of 0.1 parts by mol or more and 1.0 part by mol or less, based on 100 parts by mol of the main component. The content of the first subcomponent may be a content of the element of Mn, V, Cr, Fe, Ni, Co, Cu, or Zn included in the first subcomponent, regardless of the form of addition such as that of oxide or carbonate. For example, when $V_2O_5$, an oxide of V, is included in 0.1 parts by mol, a sum of the content of an element V may be 0.2 parts by mol.

The first subcomponent serves to improve reduction resistance of a dielectric ceramic composition and to improve high-temperature withstand voltage characteristics of a multilayer ceramic electronic component to which the dielectric material is applied.

Second Subcomponent

According to an embodiment, the dielectric material according to the present disclosure may include at least one of fixed-valence acceptor elements including Mg, oxides thereof, and carbonates thereof, as a second subcomponent.

The second subcomponent may be included in an amount of 2.0 parts by mol or less, based on 100 parts by mol of the main component. The content of the second subcomponent may be based on a content of an Mg element included in the second subcomponent, regardless of the form of the element such as that of oxide or carbonate. A lower limit of the second subcomponent is not necessarily limited. However, the lower limit of the second subcomponent may be, for example, 0 parts by mol or more, or more than 0 parts by mol, based on 100 parts by mol of the main component, but is not limited thereto.

When the content of the second subcomponent is greater than 2.0 parts by mol based on 100 part by mol of the main component, a dielectric constant may be reduced and high-temperature withstand voltage characteristics may be deteriorated.

Third Subcomponent

According to an embodiment, the dielectric material according to the present disclosure may include at least one selected from the group consisting of Y, Dy, Ho, Er, Gd, Ce, Nd, Sm, Tb, Tm, La, Gd, Yb, oxides thereof, and carbonates thereof, as a third subcomponent.

The third subcomponent may be included in an amount of 0.3 parts by mol or more or 5.4 parts by mol or less, based on 100 parts by mol of the main component. The third subcomponent may be included within a range of 0.3 parts by mol or more and 5.4 parts by mol or less, based on 100 parts by mol of the main component. The content of the third subcomponent may be a total content of the elements among Y, Dy, Ho, Er, Gd, Ce, Nd, Sm, Tb, Tm, La, Gd, and Yb, included in the third subcomponent, regardless of the form of addition such as that of oxide or carbonate.

The third subcomponent may serve to prevent deterioration in reliability of a multilayer ceramic electronic component to which the dielectric material according to an example is applied. When the third subcomponent is outside of the above-described range, high-temperature withstand voltage characteristics may be deteriorated.

Fourth Subcomponent

According to an embodiment, the dielectric material according to the present disclosure may include a fourth subcomponent including one or more elements of Ba and Ca, oxides thereof, and carbonates thereof.

The fourth subcomponent may be included in an amount of 5.0 parts by mol or less, based on 100 parts by mol of the main component. A lower limit of the fourth subcomponent may be, for example, 0 parts by mol or more, or more than 0 parts by mol, based on 100 parts by mol of the main component. The content of the fourth subcomponent may be a total content of Ba and Ca, included in the fourth subcomponent, regardless of the form of addition such as that of oxide or carbonate.

The fourth subcomponent may be included in an amount of 5.0 parts by mol, based on 100 parts by mol of the main component, to adjust a crystal structure of the dielectric material according to the present disclosure.

Fifth Subcomponent

According to an embodiment, the dielectric material according to the present disclosure may include a fifth subcomponent including at least one selected from the group consisting of an oxide of Si element, a carbonate of Si element, and glass including Si element.

The fifth subcomponent may be included in an amount of 0.5 parts by mol or more or 5.0 parts by mol or less, based on 100 parts by mol of the main component. The fifth subcomponent may be included within a range of 0.5 parts by mol or more and 5.0 parts by mol or less, based on 100 parts by mol of the main component. The content of the fifth subcomponent may be based on a content of the Si element included in the fifth subcomponent, regardless of the form of the Si element such as that of oxide or carbonate.

When the content of the fifth subcomponent is less than 0.5 parts of mol based on 100 parts of mol of the main component, a dielectric constant and a high-temperature withstand voltage may be decreased. When the content of the fifth subcomponent is greater than 5.0 parts of mol, issues such as a reduction in sinterability and compactness, formation of a secondary phase, and the like, may occur.

Sixth Subcomponent

According to an embodiment, the dielectric material according to the present disclosure may include a sixth subcomponent including at least one element selected from the group consisting of Na, Li, oxides thereof, and carbonates thereof.

The sixth subcomponent may be included in an amount of 1.0 part by mol or less, based on 100 parts by mol of the main component. A lower limit of the content of the sixth subcomponent may be, for example, 0 parts by mol or more, or more than 0 parts by mol based on 100 parts by mol of the main component.

The content of the sixth subcomponent may be based on a total content of the elements of Na and Li, included in the sixth subcomponent, regardless of the form of addition such as that of oxide or carbonate. The sixth subcomponent may be included as a sintering aid and may serve to decrease a sintering temperature.

In an example, the dielectric ceramic composition according to the present disclosure may include the above-described third, fourth, and fifth subcomponents. When an X-axis denotes the content of the fifth subcomponent and a Y-axis denotes a sum of the contents of the third subcomponent and the fourth subcomponent, a relationship between the contents of the third, fourth, and fifth subcomponents may belong to the boundary and interior of a rectangle connecting a point A(0.500, 1.900), a point B(0.500, 3.10), a point C(5.000, 5.400), and a point D(5.000, 3.275).

Figure 10:
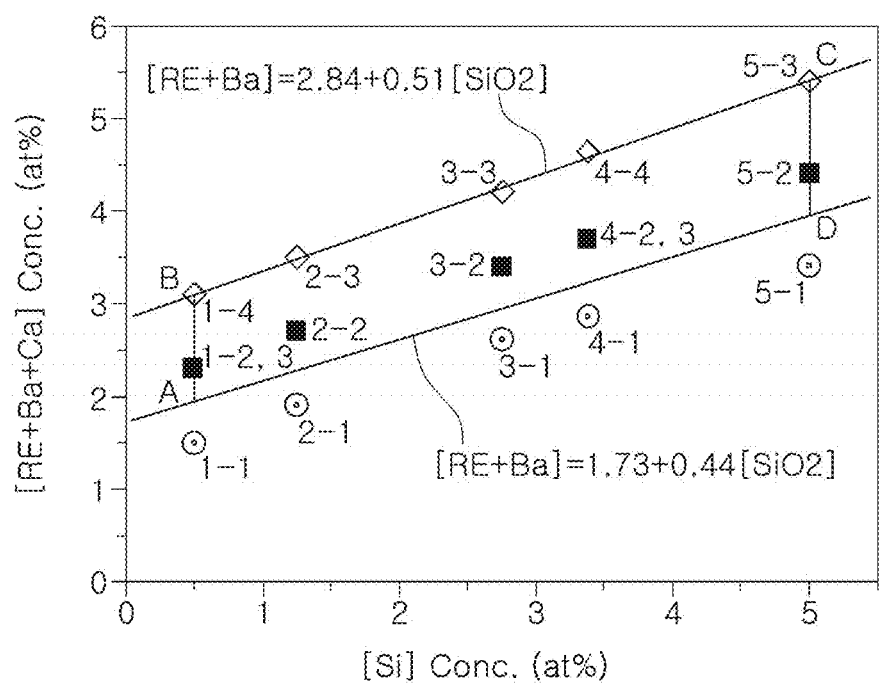
FIG. 10 is a graph illustrating the contents of third, fourth, and fifth subcomponents of an experimental example of the invention of the present disclosure.

FIG. 10 illustrates the boundary and interior of a rectangle connecting the points A, B, C, and D. The boundary and interior of the rectangle connecting the points A, B, C, and D may be confirmed through embodiments to be described later.

The present disclosure also relates to a multilayer ceramic electronic component.

FIG. 1 is a schematic perspective view of a multilayer ceramic electronic component according to an embodiment, FIG. 2 is a cross-sectional view of the multilayer ceramic electronic component taken along line I-I' in FIG. 1, and FIG. 3 is an enlarged view of region 'A' in FIG. 2.

Referring to FIGS. 1 to 3, a multilayer ceramic electronic component 100 according to an embodiment may include a ceramic body 110 including a dielectric layer 111, and a first internal electrode 121 and a second internal electrode 122. The multilayer ceramic electrode component 100 may include a first external electrode 131 and a second eternal electrode 132, respectively disposed on external surfaces of the ceramic body 110 and respectively connected to the first internal electrode 121 and the first internal electrode 122.

A shape of the ceramic body 110 is not necessarily limited, but may be a hexahedral shape or a shape similar to a hexahedral shape, as illustrated in the drawings. Even in the case that the ceramic body 110 does not have a hexahedral shape having perfectly straight lines due to shrinkage of ceramic powder particles included in the ceramic body 110 in a sintering process, the ceramic body 110 may have a substantially hexahedral shape.

The ceramic body 110 may be formed by alternately laminating a ceramic green sheet, on which the first internal electrode 121 is printed, and a ceramic green sheet, on which the second internal electrode 122 is printed, in the thickness direction (the Z direction).

In the ceramic body 110, dielectric layers 111 and internal electrodes 121 and 122 may be alternately laminated in a third direction. A plurality of dielectric layers 111, constituting ceramic body 110, may be in a sintered state, and adjacent dielectric layers 111 may be integrated with each other so that boundaries therebetween are not readily apparent without using a scanning electron microscope (SEM).

According to an embodiment, the dielectric layer 111 may include the above-described dielectric material having a layered structure, and may include a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$ ($0 \leq x \leq 1$ and $0 \leq y \leq 0.05$) and a subcomponent. In addition to the main component and the subcomponent of the above-described dielectric material, a variety of ceramic additives, organic solvents, plasticizers, binders, dispersants, and the like, may be added as materials of the dielectric layer 111, depending on the purpose of the present disclosure.

The dielectric layer 111 is formed by adding an additive required for slurry, including the above-described main component and subcomponent, and applying and drying the additive to and on a carrier film to prepare a plurality of ceramic sheets. Each of the ceramic sheets may be prepared by forming the slurry into a sheet having a thickness of several micrometers (μm) using a doctor blading method, but the present disclosure is not limited thereto.

In the dielectric layer 111, when an angle corresponding to a maximum peak is referred to as $\theta_0$ and angles corresponding to a full width at half maximum (FWHM) are respectively referred to as $\theta_1$ and $\theta_2$ ($\theta1 < \theta2$) in the peaks of (002) and (200) plane of an XRD pattern using Cu Kα1 radiation (wavelength λ=1.5406 Å), $(\theta_2-\theta_0)/(\theta_0-\theta_1)$ may be greater than 0.54 to 1.0 or less. Since the content related to the XRD pattern is the same as described above, a detailed description thereof will be omitted.

The first and second internal electrodes 121 and 122 may be laminated such that end surfaces thereof are alternately exposed to surfaces of both end portions of the ceramic body 110 opposing each other, respectively. A material of the first and second internal electrodes 121 and 122 is not necessarily limited. For example, the first and second internal electrodes 121 and 122 may be formed using a conductive paste including at least one of silver (Ag), palladium (Pd), gold (Au), platinum (Pt), nickel (Ni), copper (Cu), tin (Sn), tungsten (W), titanium (Ti), and alloys thereof. A printing method of the conductive paste may be a screen-printing method, a gravure printing method, or the like, but is not limited thereto.

In a multilayer ceramic electronic component according to an example of the invention of the present disclosure, a first external electrode 131 and a second external electrode 132 may be disposed on external surfaces of a ceramic body.

The first external electrode 131 may be connected to a first internal electrode 121, and the second external electrode 132 may be connected to a second internal electrode 122.

The first external electrode 131 and the second external electrode 132 may include a conductive metal. The conductive metal may be at least one of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto.

In another example of the invention of the present disclosure, the subcomponent of the multilayer ceramic electronic component according to the present disclosure may include at least one of a first subcomponent including at least one compound selected from the group consisting of a variable-valence acceptor element, including one or more elements among Mn, V, Cr, Fe, Ni, Co, Cu, and Zn, oxides thereof, and carbonates thereof; a second subcomponent including at least one compound selected from the group consisting of fixed-valence acceptor elements including Mg, oxides thereof, and carbonates thereof; a third subcomponent including at least one compound selected from the group consisting of Y, Dy, Ho, Er, Gd, Ce, Nd, Sm, Tb, Tm, La, Gd, and Yb, oxides thereof, and carbonates thereof; a fourth subcomponent including at least one compound selected from the group consisting of Ba and Ca, oxides thereof, and carbonates thereof; a fifth subcomponent including at least one compound selected from the group consisting of an oxide of Si element, a carbonate of Si element, and glass including Si element; and a sixth subcomponent including at least one compound selected from the group consisting of a compound including an element of Na, a compound including an element of Li, oxides thereof, and carbonates thereof.

In another example of the invention of the present disclosure, the subcomponent of the multilayer ceramic electronic component may include a third subcomponent including at least one compound selected from the group consisting of a compound including an element of Y, Dy, Ho, Er, Gd, Ce, Nd, Sm, Tb, Tm, La, Gd, or Yb, an oxide including the element of Y, Dy, Ho, Er, Gd, Ce, Nd, Sm, Tb, Tm, La, Gd, or Yb, and a carbonate including the element of Y, Dy, Ho, Er, Gd, Ce, Nd, Sm, Tb, Tm, La, Gd, or Yb; a fourth subcomponent including at least one compound selected from the group consisting of a compound including an element of Ba or Ca, an oxide including the element of Ba or Ca, and a carbonate including the element of Ba or Ca; and a fifth subcomponent including at least one compound selected from the group consisting of an oxide of Si element, a carbonate of Si element, and glass including Si element. When an X-axis denotes the content of the fifth subcomponent and a Y-axis denotes a sum of the contents of the third subcomponent and the fourth subcomponent, a relationship between the contents of the third, fourth, and fifth subcomponents may belong to the boundary and interior of a rectangle connecting a point A(0.500, 1.900), a point B(0.500, 3.10), a point C(5.000, 5.400), and a point D(5.000, 3.275).

The detailed descriptions of the dielectric material, the main component, and the subcomponent are the same as the description of the above-described dielectric material according to an embodiment and, therefore, will be omitted. In this specification, although a description has been given of a case in which a multilayer ceramic electronic component is a multilayer ceramic capacitor, the present disclosure is not limited thereto.

Hereinafter, although the present disclosure will be described in further detail with reference to an example, which has been disclosed for illustrative purposes, it is not limited thereto.

Example

In this example, $BaTiO_3$ powder particles having an average particle size of 100 nm was used as a raw material of the main component. Raw material powder particles of the main components and subcomponents, corresponding to Composition 1-1 to Composition 5-3 listed in Table 1, were milled for 10 hours by using zirconia balls as the mixing/dispersing media and mixing ethanol/toluene with a dispersant. After mixing a binder with the mixed solution, the raw material powder particles were additionally milled for 10 hours.

Embodiments 1-2-A, 1-2-B, and 1-2-C, listed in Table 1, indicate embodiments in which, before introducing a binder, milling times were increased to 20, 30, and 40 hours to reduce tetragonality (c/a) of a dielectric material, for example, to increase B/A of an XRD peak, respectively.

Molding sheets, respectively having thicknesses of 0.8 µm and 10 µm, were manufactured using prepared slurries by a molding machine for manufacturing a thin-film sheet. A nickel (Ni) internal electrode was printed on each of the molding sheets.

A top and bottom cover was manufactured by laminating a covering sheet (having a thickness of 10 to 13 µm) to 25 layers, and a pressing bar was manufactured by pressing and laminating a printed active sheet of 21 layers.

The pressing bar was cut into a chip having a size of 3.2 mm×1.6 mm using a cutter. A completely manufactured MLCC chip having a 3216 size was plasticized and then sintered at temperature of about 1080 to 1120° C. under a reducing atmosphere of 0.1% $H_2$/99.9% $N_2$ to 1.0% $H_2$/99.0% $N_2$ ($H_2O/H_2/N_2$ atmosphere) within a maintenance time range of 10 minutes to an hour. The sintered MLCC chip was heat-treated for three hours at temperature of about 950° C. under $N_2$ atmosphere for reoxidation.

An external electrode was completed by performing a termination process and an electrode sintering process on the sintered chip using a Cu paste. Accordingly, an MLCC chip having a size of 3.2 mm×1.6 mm, in which a dielectric material has a thickness of approximately 0.6 µm and the number of dielectric layers is 20, was manufactured after the sintering.

Room-temperature capacitance and dielectric loss of the MLCC chip were measured under conditions of 1 KHz ad AC 0.5 V/µm using an LCR meter. A dielectric constant of a dielectric material of the MLCC chip was calculated from the capacitance of an MLCC and a thickness of a dielectric layer, an area of internal electrodes, and the number of laminated layers in the MLCC.

Room-temperature insulating resistance IR was measured after 60 seconds in the state in which the samples were taken by 10 and DC 10 V/µm was applied.

Capacitance variation depending on a temperature was measured within a temperature range of −55° C. to 145° C.

A high-temperature IR boosting test measured a resistance deterioration behavior while increasing a voltage step by DC 10 V/µm at 150° C. and the resistance value was measured by 5 seconds, and the time of each step is an hour. A high-temperature withstand voltage was derived from the high-temperature IR boosting test. The high-temperature withstand voltage refers to a maximum voltage allowing IR to be maintained at $10^6 \Omega$ or more when a DC voltage level of 5 V/μm was applied to a 3216-sized chip including 20 dielectric layers after being sintered, at temperature of 150° C. for an hour, and was then continuously increased by 5 V/μm per each step.

Table 2 illustrates characteristics of a prototype chip corresponding to the embodiment listed in Table 1.

Referring to Table 2 and Table 4, determination of characteristics is shown. In Table 1 and Table 2, "○" indicates a case, satisfying all of the conditions in which DC bias high field dielectric constant @8V/μm (a dielectric constant when DC 8 V/μm was applied) was 1000 or more, a high-temperature (150° C.) withstand was 50 V/μm or more, and

TABLE 1

| | Number of Additive Moles per 100 Moles of Base Material (BaTiO$_2$) | | | | | | | | | |
|---|---|---|---|---|---|---|---|---|---|---|
| | First Subcomponent | | Second Subcomponent | Third Subcomponent | Fourth Subcomponent | | Fifth Subcomponent | Sixth Subcomponent | | |
| Embodiment | MnO$_2$ | V$_2$O$_5$ | MgCO$_2$ | Dy$_2$O$_2$ | BaCO$_2$ | CaCO$_2$ | SiO$_2$ | Na | Li | Ba, Ca + RE |
| 1-1 | 0.100 | 0.100 | 0.00 | 0.15 | 1.20 | 0.00 | 0.50 | 0.20 | 0.20 | 1.50 |
| 1-2 | 0.100 | 0.100 | 0.00 | 0.15 | 2.00 | 0.00 | 0.50 | 0.20 | 0.20 | 2.00 |
| 1-3 | 0.100 | 0.100 | 0.00 | 0.15 | 0.00 | 2.00 | 0.50 | 0.20 | 0.20 | 2.30 |
| 1-4 | 0.100 | 0.100 | 0.00 | 0.15 | 2.80 | 0.00 | 0.50 | 0.20 | 0.20 | 3.10 |
| 2-1 | 0.100 | 0.100 | 0.20 | 0.15 | 1.60 | 0.00 | 1.25 | 0.50 | 0.50 | 1.90 |
| 2-2 | 0.100 | 0.100 | 0.20 | 0.15 | 2.40 | 0.00 | 1.25 | 0.50 | 0.50 | 2.70 |
| 2-3 | 0.100 | 0.100 | 0.20 | 0.15 | 3.20 | 0.00 | 1.25 | 0.50 | 0.50 | 3.50 |
| 3-1 | 0.100 | 0.100 | 0.20 | 0.70 | 1.20 | 0.00 | 2.75 | 0.20 | 0.20 | 2.60 |
| 3-2 | 0.100 | 0.100 | 0.20 | 0.70 | 2.00 | 0.00 | 2.75 | 0.20 | 0.20 | 3.40 |
| 3-3 | 0.100 | 0.100 | 0.20 | 0.70 | 2.80 | 0.00 | 2.75 | 0.20 | 0.20 | 6.20 |
| 4-1 | 0.100 | 0.100 | 2.00 | 0.50 | 1.85 | 0.00 | 3.38 | 0.00 | 0.00 | 2.85 |
| 4-2 | 0.100 | 0.100 | 2.00 | 0.50 | 2.70 | 0.00 | 3.38 | 0.00 | 0.00 | 3.70 |
| 4-3 | 0.100 | 0.100 | 2.00 | 0.50 | 0.00 | 2.70 | 3.38 | 0.00 | 0.00 | 3.70 |
| 4-4 | 0.100 | 0.100 | 2.00 | 0.50 | 3.65 | 0.00 | 3.38 | 0.00 | 0.00 | 4.65 |
| 5-1 | 0.500 | 0.250 | 1.00 | 0.50 | 2.40 | 0.00 | 5.00 | 0.00 | 0.00 | 3.60 |
| 5-2 | 0.500 | 0.250 | 1.00 | 0.50 | 3.40 | 0.00 | 5.00 | 0.00 | 0.00 | 4.40 |
| 5-3 | 0.500 | 0.250 | 1.00 | 0.50 | 4.40 | 0.00 | 5.00 | 0.00 | 0.00 | 5.40 |
| 1-2-A Milling 15h | 0.100 | 0.100 | 0.00 | 0.15 | 3.00 | 0.00 | 0.50 | 0.20 | 0.20 | 2.30 |
| 1-2-B Milling 20h | 0.100 | 0.100 | 0.00 | 0.15 | 2.00 | 0.00 | 0.50 | 0.20 | 0.20 | 2.30 |
| 1-2-C Milling 30h | 0.100 | 0.100 | 0.00 | 0.15 | 2.00 | 0.00 | 0.50 | 0.20 | 0.20 | 2.30 |

TABLE 2

| | Proto-type Chip Characteristics | | | | | | |
|---|---|---|---|---|---|---|---|
| Embodiment | XRD Peak B/A Ratio | Dielectric Constant | DF (%) | TCC (%) (85° C.) | High Field Dielectric Constant @ DC 8 V/μm | High Temperature (150° C.) Withstand Voltage (V/μm) * | Determination of Characteristics ○: OK X: NG |
| 1-1 | 0.50 | 3642 | 6.15 | −13.6% | 855 | 80 | X |
| 1-2 | 0.58 | 2584 | 3.22 | −11.8% | 1018 | 75 | ○ |
| 1-3 | 0.68 | 2368 | 3.07 | −8.7% | 1071 | 70 | ○ |
| 1-4 | 0.92 | 2035 | 2.41 | −7.4% | 1115 | 55 | ○ |
| 2-1 | 0.51 | 3455 | 6.35 | −12.7% | 886 | 70 | X |
| 2-2 | 0.63 | 2462 | 3.02 | −8.0% | 1084 | 75 | ○ |
| 2-3 | 0.82 | 2134 | 2.48 | −6.8% | 1102 | 50 | ○ |
| 3-1 | 0.48 | 3926 | 5.86 | −15.5% | 778 | 65 | X |
| 3-2 | 0.66 | 2546 | 2.77 | −10.6% | 1055 | 70 | ○ |
| 3-3 | 0.94 | 2026 | 2.16 | −7.7% | 1123 | 50 | ○ |
| 4-1 | 0.48 | 3285 | 3.55 | −13.2% | 820 | 75 | X |
| 4-2 | 0.60 | 2564 | 2.77 | −8.5% | 1021 | 70 | ○ |
| 4-3 | 0.70 | 3402 | 2.56 | −7.1% | 1036 | 70 | ○ |
| 4-4 | 0.92 | 1995 | 2.04 | −6.6% | 1133 | 50 | ○ |
| 5-1 | 0.52 | 3318 | 3.12 | −14.5% | 925 | 70 | X |
| 5-2 | 0.61 | 2726 | 2.52 | −10.6% | 1038 | 65 | ○ |
| 5-3 | 0.85 | 2113 | 2.07 | −9.5% | 1098 | 50 | ○ |
| 1-2-A Milling 15h | 0.70 | 2345 | 3.02 | −12.3% | 1084 | 75 | ○ |
| 1-2-B Milling 20h | 0.85 | 2056 | 2.65 | −10.7% | 1103 | 75 | ○ |
| 1-2-C Milling 30h | 0.48 | 4012 | 7.85 | −17.4% | 736 | 55 | X | temperature coefficient of capacitance (TCC) (85° C.) was less than 13.5%, and "X" indicates a case, not satisfying any one of the conditions above.

In Table 1, Embodiments 1-1 to 1-4 illustrate a variation in the content of a fourth subcomponent Ba or Ca under a fixed condition in which, based on 100 moles of a raw material $BaTiO_3$ of a main component having a size of 80 nm, a sum of variable-valence elements Mn and V of a first subcomponent was 0.3 mol, the content of a second subcomponent Mg was 0 mol, the content of a rare earth element Dy of a third subcomponent was 0.3 mol, the content of a fifth subcomponent Si was 0.5 mol, and a sum of sixth subcomponents Na and Li was 0.4 mol. Table 2 illustrates characteristics of the prototype MLCC samples corresponding to Embodiments 1-1 to 1-4.

When the content of Ba was 1.2 mol (Embodiment 1-1), B/A of a (002)/(200) plane XRD peak was 0.50, and a high field dielectric constant was less than 1000. When the content of Ba was increased to 2.0 mol (Embodiment 1-2), B/A of the XRD peak was increased to 0.58, and all target characteristics of the present disclosure, such as a DC bias high field dielectric constant @8 V/μm (a dielectric constant when a DC 8V/μm is applied) of 1000 or more, a high-temperature (150° C.) withstand voltage of 50 V/μm, and TCC(85° C.)±15%, were satisfied. Even when Ba was replaced with Ca having the same content (Embodiment 1-3), the substantially same characteristics as in Embodiment 1-2 were obtained. When the content of Ba is further increased to 2.8 mol (Embodiment 1-4), B/A was further increased to 0.92 and the DC bias high field dielectric constant @8 V/μm was also further increased to 1115.

In Table 1, Embodiments 2-1 to 2-3 illustrate a variation in the content of a fourth subcomponent Ba under a fixed condition in which, based on 100 moles of a raw material $BaTiO_3$ of a main component having a size of 80 nm, a sum of variable-valence elements Mn and V of a first subcomponent was 0.3 mol, the content of a second subcomponent Mg was 0.2 mol, the content of a rare earth element Dy of a third subcomponent was 0.3 mol, the content of a fifth subcomponent Si was 1.25 mol, and a sum of sixth subcomponents Na and Li was 1.0 mol. Table 2 illustrates characteristics of the prototype MLCC samples corresponding to Embodiments 2-1 to 2-3.

When the content of Ba was 1.6 mol (Embodiment 2-1), B/A of a (002)/(200) plane XRD peak was 0.51, and a high field dielectric constant was less than 1000. When the content of Ba was increased to 2.4 mol (Embodiment 2-2), B/A of the XRD peak increased to 0.63, and all target characteristics of the present disclosure, such as a DC bias high field dielectric constant @8 V/μm (a dielectric constant when a DC 8V/μm is applied) of 1000 or more, a high-temperature (150° C.) withstand voltage of 50 V/μm, and TCC (85° C.)±15%, were satisfied. When the content of Ba is further increased to 3.2 mol (Embodiment 2-3), B/A was further increased to 0.82 and the DC bias high field dielectric constant @8 V/μm was also further increased to 1102.

In Table 1, Embodiments 3-1 to 3-3 illustrate a variation in the content of a fourth subcomponent Ba under a fixed condition in which, based on 100 moles of a raw material $BaTiO_3$ of a main component having a size of 80 nm, a sum of variable-valence elements Mn and V of a first subcomponent was 0.3 mol, the content of a second subcomponent Mg was 0.2 mol, the content of a rare earth element Dy of a third subcomponent was 1.4 mol, the content of a fifth subcomponent Si was 2.75 mol, and a sum of sixth subcomponents Na and Li was 0.4 mol. Table 2 illustrates characteristics of the prototype MLCC samples corresponding to Embodiments 3-1 to 3-3.

When the content of Ba was 1.2 mol (Embodiment 3-1), B/A of a (002)/(200) plane XRD peak was 0.48, and a high field dielectric constant was less than 1000. When the content of Ba was increased to 2.0 mol (Embodiment 3-2), B/A of the XRD peak was increased to 0.66, and all target characteristics of the present disclosure, such as a DC bias high field dielectric constant @8 V/μm (a dielectric constant when a DC 8V/μm is applied) of 1000 or more, a high-temperature (150° C.) withstand voltage of 50 V/μm, and TCC(85° C.)±15%, were satisfied. When the content of Ba was further increased to 2.8 mol, B/A was further increased to 0.82 and the DC bias high field dielectric constant @8 V/μm was also further increased to 1123.

In Table 1, Embodiments 4-1 to 4-4 illustrate a variation in the content of a fourth subcomponent Ba under a fixed condition in which, based on 100 moles of a raw material $BaTiO_3$ of a main component having a size of 80 nm, a sum of variable-valence elements Mn and V of a first subcomponent was 0.3 mol, the content of a second subcomponent Mg was 2.0 mol, and the content of a rare earth element Dy of a third subcomponent was 1.0 mol, and the content of a fifth subcomponent Si was 3.38 mol. Table 2 illustrates characteristics of the prototype MLCC samples corresponding to Embodiments 4-1 to 4-4.

When the content of Ba was 1.85 mol (Embodiment 4-1), B/A of a (002)/(200) plane XRD peak was 0.48, and a high field dielectric constant was less than 1000. When the content of Ba was increased to 2.7 mol (Embodiment 4-2), B/A of the XRD peak was increased to 0.60, and all target characteristics of the present disclosure, such as a DC bias high field dielectric constant @8 V/μm (a dielectric constant when a DC 8V/μm is applied) of 1000 or more, a high-temperature (150° C.) withstand voltage of 50 V/μm, and TCC (85° C.)±15%, were satisfied. Even when Ba was replaced with Ca having the same content (Embodiment 4-3), the substantially same characteristics as in Embodiment 4-2 were observed. When the content of Ba was further increased to 3.65 mol, B/A was further increased to 0.82 and the DC bias high field dielectric constant @8 V/μm is also further increased to 1133.

In Table 1, Embodiments 5-1 to 5-3 illustrate a variation in the content of a fourth subcomponent Ba under a fixed condition in which, based on 100 moles of a raw material $BaTiO_3$ of a main component having a size of 80 nm, a sum of variable-valence elements Mn and V of a first subcomponent was 1.0 mol, the content of a second subcomponent Mg was 1.0 mol, and the content of a rare earth element Dy of a third subcomponent was 1.0 mol, and the content of a fifth subcomponent Si was 5.00 mol. Table 2 illustrates characteristics of the prototype MLCC samples corresponding to Embodiments 5-1 to 5-3.

When the content of Ba was 2.4 mol (Embodiment 5-1), B/A of a (002)/(200) plane XRD peak was 0.52, and a high field dielectric constant was less than 1000. When the content of Ba was increased to 3.4 mol (Embodiment 5-2), B/A of the XRD peak was increased to 0.61, and all target characteristics of the present disclosure, such as a DC bias high field dielectric constant @8 V/μm (a dielectric constant when a DC 8V/μm is applied) of 1000 or more, a high-temperature (150° C.) withstand voltage of 50 V/μm, and TCC(85° C.)±15%, were satisfied. When the content of Ba was further increased to 4.4 mol, B/A was further increased to 0.85, and the DC bias high field dielectric constant @8 V/μm was also further increased to 1098.

In Table 1, Embodiments 1-2-A to 1-2-C are embodiments depending on a mixing milling time of batch slurry when a subcomponent, corresponding to Embodiment 1-2, is applied to 100 moles of a raw material $BaTiO_3$ of a main component having a size of 80 nm. Table 2 illustrates characteristics of the prototype MLCC samples corresponding to Embodiments 1-2-A to 1-2-C.

Mixing milling times of Embodiments 1-2, 1-2-A, 1-2-B, and 1-2-C were 10, 15, 20, 30 hours, respectively. As the mixing milling times were increased to 10, 15, and 20 hours, a Dc bias high field dielectric constant @8V/μm was increased to 1018, 1084, and 1103 while increasing B/A of a (002)/(200) plane XRD peak to 0.58, 0.70, and 0.85. Therefore, the DC bias high field dielectric constant @8V/μm was improved even when tetragonality (c/a) of a dielectric material was reduced and B/A of the XRD peak was increased by increasing the mixing milling time, other than by adjusting the composition of subcomponent additives. On the other hand, when the mixing milling time is excessively increased to 30 hours (Embodiment of 1-2-C), a grain size of the dielectric material was rapidly increased, so that B/A of the XRD peak was reduced to rapidly decrease the DC bias high field dielectric constant @8V/μm to 726.

TABLE 3

| Embodiment | Main Component of Base Material (Subcomponent: Embodiment 1-2 applied) | y |
|---|---|---|
| 1-2 | $BaTiO_3$ | — |
| 6 | $Ba(Ti_{1-y}Zr_y)O_3$ | 0.020 |
| 7 | | 0.050 |
| 8 | | 0.070 |
| 9 | $Ba(Ti_{1-y}Sn_y)O_3$ | 0.020 |
| 10 | | 0.050 |
| 11 | | 0.070 |
| 12 | $Ba(Ti_{1-y}Hf_y)O_3$ | 0.020 |
| 13 | | 0.050 |
| 14 | | 0.070 | decreased from −11.8%, to −12.6%, and −14.7%. Therefore, it may be confirmed that the DC bias high field dielectric constant @8V/μm was improved even when B/A of the (002)/(200) plane XRD peak was increased by substituting a portion of the Ti element with Zr, rather than other than by adjusting a composition of subcomponent additives. On the other hand, when the content of Zr was excessively increased from 0 to 0.070 (Embodiment 8), B/A of the XRD peak was further increased and the DC bias high field dielectric constant @8V/um was further increased to 1284, but the 85° C. TCC was also increased to −18.4% to cause TCC characteristics to be unsatisfactory. Therefore, the content of Zr in a composition of the main component is within a range of 0 to 0.05 in the formula of Ba $(Ti_{1-y}Zr_y)O_3$, the target characteristic of eth present disclosure are satisfied.

In Table 3, Embodiments 9 to 11 and Embodiments 12 to 14 are embodiments in which a portion of a main component Ti is substituted with Sn and Hf, and the content thereof is increased to 0.020, 0.050, and 0.070 in formulae Ba $(Ti_{1-y}Sn_y)O_3$ (Embodiments 9 to 11) and Ba $(Ti_{1-y}Hf_y)O_3$ (Embodiments 12-14). Table 4 illustrates characteristics of prototype MLCC samples corresponding to Embodiments 9 to 11 and Embodiments 12 to 14.

Similarly to the case in which Zr is substituted, as the contents of Sn and Hf were increased to 0.020 and 0.050 (Embodiments 9, 10, 12 and 13), 850° C. TCC was decreased within a range satisfying the specification, B/A of a (002)/(200) plane XRD peak was increased, and a DC bias high field dielectric constant @8V/μm was increased. On the other hand, when the contents of Sn and Hf was excessively increased to 0.070 (Embodiments 11 and 14), B/A of the XRD peak was further increased and the DC bias high field dielectric constant @8V/μm was also further increased, but 850° C. TCC did not satisfy X5R TCC characteristics required to be ±15% or less. Therefore, when the content of Zr or Sn or Hf in the composition of the main component is

TABLE 4

| Embodiment | XRD Peak B/A Ratio | Dielectric Constant | DF (%) | TCC (%) (85° C.) | High Field Dielectric Constant @ DC 8 V/μm | High Temperature (150° C.) Withstand Voltage (V/μm) * | ○: OK X: NG |
|---|---|---|---|---|---|---|---|
| 1-2 | 0.68 | 2584 | 3.22 | −11.8% | 1018 | 75 | ○ |
| 6 | 0.71 | 2623 | 3.22 | −12.6% | 1117 | 75 | ○ |
| 7 | 0.84 | 2774 | 3.18 | −14.7% | 1205 | 70 | ○ |
| 8 | 0.90 | 2732 | 2.95 | −18.4% | 1284 | 70 | X |
| 9 | 0.70 | 2632 | 3.18 | −12.4% | 1084 | 75 | ○ |
| 10 | 0.81 | 2655 | 3.04 | −14.9% | 1159 | 70 | ○ |
| 11 | 0.92 | 2671 | 2.88 | −19.2% | 1203 | 70 | X |
| 12 | 0.69 | 3604 | 3.14 | −13.0% | 1052 | 75 | ○ |
| 13 | 0.85 | 2688 | 3.05 | −14.8% | 1178 | 75 | ○ |
| 14 | 0.91 | 2725 | 2.56 | −20.4% | 1296 | 75 | X |

In Table 3, Embodiments 6 to 14 apply a subcomponent corresponding to Embodiment 1-2 and are embodiments depending on a composition variation of a raw material of a main component having a size of 100 nm. Table 4 illustrates characteristics of the prototype MLCC samples of Embodiments 6 to 14.

When a portion of Ti was substituted with Zr, as the content of Zr is increased from 0 to 0.020, and 0.050 (Embodiments 1-2, 6, and 7), B/A of a (002)/(200) plane XRD peak was increased from 0.58 to 0.71, and 0.84, and a DC bias high field dielectric constant @8V/μm increased from 1018 to 1117, and 1205, whereas 85° C. TCC in the range of 0 to 0.05 in the formulae of Ba $(Ti_{1-y}Sn_y)O_3$ and Ba $(Ti_{1-y}Hf_y)O_3$, the target characteristics of the present disclosure are satisfied.

In addition, boundary values of a sum of the contents of the third subcomponent and the fourth subcomponent, based on the content of the fifth subcomponent shown in FIG. 10, may be confirmed through Embodiments 1-4, 2-3, 3-3, 4-4 and 5-3. Also, it may be confirmed that Embodiments 1-2, 2-2, 3-2, 4-2, and 5-2 satisfy determination of characteristics, while Embodiments 1-1, 1-2, 2-2, 3-1, 4-1, and 5-1 do not satisfy the determination of characteristics. Since it may be confirmed that the determination of characteristics varies at intermediate values of Embodiments 1-1, 2-1, 3-1, 4-1, and 5-1 and Embodiments 1-2, 2-2, 3-2, 4-2, and 5-2, the intermediate values of the above embodiments was determined to be boundary values. As a result, it may be confirmed that when content ranges of the third, fourth, and fifth subcomponents belong to the boundary and interior of a rectangle connecting A, B, C, and D of FIG. 10, improved high-temperature withstand voltage and high field DC bias characteristics may be exhibited.

As described above, according to the present disclosure, a dielectric material having an increased DC bias dielectric constant, and a multilayer ceramic electronic component may be provided.

In addition, a dielectric material, having improved high-temperature withstand voltage characteristics, and a multilayer ceramic electronic component, may be provided.

In addition, a dielectric material, capable of satisfying X5R or X7R, and a multilayer ceramic electronic component may be provided.

While embodiments have been shown and described above, it will be apparent to those skilled in the art that modifications and variations could be made without departing from the scope of the present disclosure as defined by the appended claims.

What is claimed is:

1. A dielectric material comprising:
a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$, wherein $0 \leq x \leq 1$ and $0 \leq y \leq 0.05$, and
a subcomponent,
wherein $(\theta_2-\theta_0)/(\theta_0-\theta_1)$ is greater than 0.54 and 1.0 or less in the peaks of (002) and (200) plane of an X-ray diffraction (XRD) pattern using Cu Kα1 radiation having a wavelength λ of 1.5406 Å, wherein $\theta_0$ is an angle corresponding to a maximum peak, and $\theta_1$ and $\theta_2$ are angles corresponding to a full width at half maximum (FWHM) respectively, wherein $\theta_1 < \theta_2$.

2. The dielectric material of claim 1, wherein the dielectric material comprises grains and grain boundaries.

3. The dielectric material of claim 1, wherein the subcomponent comprises at least one of a first subcomponent, a second subcomponent, a third subcomponent, a fourth subcomponent, a fifth subcomponent, or a sixth subcomponent, wherein:
the first subcomponent includes at least one compound selected from the group consisting of: a compound including a variable-valence acceptor element of Mn, V, Cr, Fe, Ni, Co, Cu, or Zn; an oxide including at least one element of Mn, V, Cr, Fe, Ni, Co, Cu, or Zn; and a carbonate including at least one element of Mn, V, Cr, Fe, Ni, Co, Cu, or Zn;
the second subcomponent includes at least one compound selected from the group consisting of: a compound including at least one fixed-valence acceptor element including Mg, an oxide including at least one fixed-valence acceptor element including Mg, and a carbonate including at least one fixed-valence acceptor element including Mg;
the third subcomponent includes at least one compound selected from the group consisting of: a compound including at least one element of Y, Dy, Ho, Er, Gd, Ce, Nd, Sm, Tb, Tm, La, Gd, or Yb; an oxide including at least one element of Y, Dy, Ho, Er, Gd, Ce, Nd, Sm, Tb, Tm, La, Gd, or Yb; and a carbonate including at least one element of Y, Dy, Ho, Er, Gd, Ce, Nd, Sm, Tb, Tm, La, Gd, or Yb;
the fourth subcomponent includes at least one compound selected from the group consisting of: a compound including at least one element of Ba or Ca; an oxide including at least one of Ba or Ca; and a carbonate including at least one of Ba or Ca;
the fifth subcomponent includes at least one compound selected from the group consisting of an oxide of Si element, a carbonate of Si element, and glass including Si element; and
the sixth subcomponent includes at least one compound selected from the group consisting of: a compound including at least one of Na or Li; an oxide including at least one of Na or Li; and a carbonate including at least one of Na or Li.

4. The dielectric material of claim 1, wherein the subcomponent includes a first subcomponent including at least one selected from the group consisting of: a compound including at least one variable-valence acceptor element of Mn, V, Cr, Fe, Ni, Co, Cu, or Zn; an oxide including at least one element of Mn, V, Cr, Fe, Ni, Co, Cu, or Zn; and a carbonate including at least one element of Mn, V, Cr, Fe, Ni, Co, Cu, or Zn, and
the first subcomponent is included within a range of 0.1 parts by mol or more and 1.0 part by mol or less, based on 100 parts by mol of the main component.

5. The dielectric material of claim 1, wherein the subcomponent includes a second subcomponent including at least one selected from the group consisting of a compound including at least one of fixed-valence acceptor elements including Mg, an oxide including the fixed-valence acceptor elements including Mg, and a carbonate including the fixed-valence acceptor elements including Mg, and
the second subcomponent is included within a range of 2.0 parts by mol or less, based on 100 parts by mol of the main component.

6. The dielectric material of claim 1, wherein the subcomponent includes a third subcomponent including at least one selected from the group consisting of: a compound including at least one element of Y, Dy, Ho, Er, Gd, Ce, Nd, Sm, Tb, Tm, La, Gd, or Yb; an oxide including at least one element of Y, Dy, Ho, Er, Gd, Ce, Nd, Sm, Tb, Tm, La, Gd, or Yb; and a carbonate including at least one element of Y, Dy, Ho, Er, Gd, Ce, Nd, Sm, Tb, Tm, La, Gd, or Yb, and
the third subcomponent is included within a range of 0.3 parts by mol or more and 5.4 parts by mol or less, based on 100 parts by mol of the main component.

7. The dielectric material of claim 1, wherein the subcomponent includes a fourth subcomponent including at least one selected from the consisting of: a compound including at least one element of Ba or Ca; an oxide including at least one element of Ba or Ca; and a carbonate including at least one element of Ba or Ca, and
the fourth subcomponent is included in an amount of 5.0 parts by mol or less, based on 100 parts by mol of the main component.

8. The dielectric material of claim 1, wherein the subcomponent includes a fifth subcomponent including at least one selected from the group consisting of an oxide of Si element, a carbonate of Si element, and glass including Si element, and
the fifth subcomponent is included within a range of 0.5 parts by mol or more and 5.0 parts by mol or less, based on 100 parts by mol of the main component.

9. The dielectric material of claim 1, wherein the subcomponent includes a sixth subcomponent including at least one selected from the group consisting of: a compound including at least one element of Na or Li; an oxide including at least one element of Na or Li; and a carbonate including at least one element of Na or Li, and
the sixth subcomponent is included in an amount of 1.0 part by mol or less, based on 100 parts by mol of the main component.

10. The dielectric material of claim 1, wherein the subcomponent of the multilayer ceramic electronic component comprises a third subcomponent, a fourth subcomponent, and a fifth subcomponent, wherein:
the third subcomponent includes at least one compound selected from the group consisting of: a compound including at least one element of Y, Dy, Ho, Er, Gd, Ce, Nd, Sm, Tb, Tm, La, Gd, or Yb; an oxide including at least one element of Y, Dy, Ho, Er, Gd, Ce, Nd, Sm, Tb, Tm, La, Gd, or Yb; and a carbonate including at least one element of Y, Dy, Ho, Er, Gd, Ce, Nd, Sm, Tb, Tm, La, Gd, or Yb;
the fourth subcomponent includes at least one compound selected from the group consisting of: a compound including at least one element of Ba or Ca; an oxide including at least one element of Ba or Ca; and a carbonate including at least one element of Ba or Ca; and
the fifth subcomponent includes at least one compound selected from the group consisting of an oxide of Si element, a carbonate of Si element, and glass including Si element, and
when an X-axis denotes a content of the fifth subcomponent and a Y-axis denotes a sum of contents of the third subcomponent and the fourth subcomponent, a relationship between the contents of the third, fourth, and fifth subcomponents belong to a boundary or an interior of the boundary connecting a point A(0.500, 1.900), a point B(0.500, 3.10), a point C(5.000, 5.400), and a point D(5.000, 3.275).

11. The dielectric material of claim 1, wherein the $(\theta_2-\theta_0)/(\theta_0-\theta_1)$ is 0.56 or more.

12. The dielectric material of claim 1, wherein the $(\theta_2-\theta_0)/(\theta_0-\theta_1)$ is 0.58 or more.

13. The dielectric material of claim 1, wherein the $(\theta_2-\theta_0)/(\theta_0-\theta_1)$ is less than 1.0.

14. A multilayer ceramic electronic component comprising:
a ceramic body including a dielectric layer, a first internal electrode, and a second internal electrode; and
a first external electrode and a second external electrode, respectively disposed on external surfaces of the ceramic body and respectively connected to the first internal electrode and the second internal electrode,
wherein the dielectric layer includes a main component represented by $(Ba_{1-x}Ca_x)(Ti_{1-y}Zr_y)O_3$, $(Ba_{1-x}Ca_x)(Ti_{1-y}Sn_y)O_3$, or $(Ba_{1-x}Ca_x)(Ti_{1-y}Hf_y)O_3$, wherein $0 \leq x \leq 1$ and $0 \leq y \leq 0.05$, and a subcomponent, and
$(\theta_2-\theta_0)/(\theta_0-\theta_1)$ is greater than 0.54 and 1.0 or less in the peaks of (002) and (200) plane of an X-ray diffraction (XRD) pattern using Cu K$\alpha$1 radiation having a wavelength $\lambda$ of 1.5406 Å, wherein $\theta_0$ is an angle corresponding to a maximum peak, and $\theta_1$ and $\theta_2$ are angles corresponding to a full width at half maximum (FWHM) respectively, wherein $\theta_1 < \theta_2$.

15. The multilayer ceramic electronic component of claim 14, wherein the subcomponent comprises at least one of a first subcomponent, a second subcomponent, a third subcomponent, a fourth subcomponent, a fifth subcomponent, or a sixth subcomponent:
the first subcomponent includes at least one compound selected from the group consisting of: a compound including at least one variable-valence acceptor element of Mn, V, Cr, Fe, Ni, Co, Cu, or Zn; an oxide including at least one of Mn, V, Cr, Fe, Ni, Co, Cu, or Zn, and a carbonate including at least one of Mn, V, Cr, Fe, Ni, Co, Cu, or Zn;
the second subcomponent includes at least one compound selected from the group consisting of: a compound including at least one fixed-valence acceptor element including Mg, an oxide including at least one fixed-valence acceptor element including Mg, and a carbonate including at least one fixed-valence acceptor element including Mg;
the third subcomponent includes at least one compound selected from the group consisting of: a compound including at least one element of Y, Dy, Ho, Er, Gd, Ce, Nd, Sm, Tb, Tm, La, Gd, or Yb; an oxide including at least one element of Y, Dy, Ho, Er, Gd, Ce, Nd, Sm, Tb, Tm, La, Gd, or Yb, and a carbonate including at least one element of Y, Dy, Ho, Er, Gd, Ce, Nd, Sm, Tb, Tm, La, Gd, or Yb;
the fourth subcomponent includes at least one compound selected from the group consisting of: a compound including at least one element of Ba of Ca; an oxide including at least one element of Ba of Ca; and a carbonate including at least one element of Ba of Ca;
the fifth subcomponent includes at least one compound selected from the group consisting of an oxide of Si element, a carbonate of Si element, and glass including Si element; and
the sixth subcomponent includes at least one compound selected from the group consisting of: a compound including at least one element of Na or Li, an oxide including at least one element of Na or Li; and a carbonate including at least one element of Na or Li.

16. The multilayer ceramic electronic component of claim 14, wherein the subcomponent of the multilayer ceramic electronic component comprises a third subcomponent, a fourth subcomponent, and a fifth subcomponent, wherein:
the third subcomponent includes at least one compound selected from the group consisting of: a compound including at least one element of Y, Dy, Ho, Er, Gd, Ce, Nd, Sm, Tb, Tm, La, Gd, or Yb; an oxide including at least one element of Y, Dy, Ho, Er, Gd, Ce, Nd, Sm, Tb, Tm, La, Gd, or Yb; and a carbonate including at least one element of Y, Dy, Ho, Er, Gd, Ce, Nd, Sm, Tb, Tm, La, Gd, or Yb;
the fourth subcomponent includes at least one compound selected from the group consisting of: a compound including at least one element of Ba or Ca; an oxide including at least one element of Ba or Ca; and a carbonate including at least one element of Ba or Ca; and
the fifth subcomponent includes at least one compound selected from the group consisting of an oxide of Si element, a carbonate of Si element, and glass including Si element, and
wherein when an X-axis denotes the content of the fifth subcomponent and a Y-axis denotes a sum of the contents of the third subcomponent and the fourth subcomponent, a relationship between the contents of the third, fourth, and fifth subcomponents belong to a boundary or an interior of the boundary connecting a point A(0.500, 1.900), a point B(0.500, 3.10), a point C(5.000, 5.400), and a point D(5.000, 3.275).

* * * * *